ately 0.03. The term "velocity" will be understood to mean superficial velocity in this specification.

United States Patent [19]
Kramer

[11] Patent Number: 4,615,796
[45] Date of Patent: Oct. 7, 1986

[54] METHOD FOR CONTACTING SOLIDS-CONTAINING FEEDS IN A LAYERED BED REACTOR

[75] Inventor: David C. Kramer, Richmond, Calif.

[73] Assignee: Chevron Research Company, San Francisco, Calif.

[21] Appl. No.: 572,483

[22] Filed: Jan. 20, 1984

Related U.S. Application Data

[63] Continuation-in-part of Ser. No. 547,162, Oct. 31, 1983, abandoned, which is a continuation of Ser. No. 316,387, Oct. 29, 1981, abandoned.

[51] Int. Cl.$^4$ .......................... B01J 8/02; C07C 3/34
[52] U.S. Cl. .................................. 208/146; 422/217; 422/191
[58] Field of Search .............. 208/146, 147, 155, 156; 210/283, 290, 807; 422/191, 217

[56] References Cited

U.S. PATENT DOCUMENTS

| | | | |
|---|---|---|---|
| 2,534,907 | 12/1950 | Ham et al. ........................... | 210/290 |
| 2,789,695 | 4/1957 | Winkler et al. ...................... | 210/807 |
| 2,893,852 | 7/1959 | Montgomery ....................... | 208/146 |
| 3,148,962 | 9/1964 | Dellinger et al. .................... | 210/290 |
| 3,562,800 | 2/1971 | Carlson et al. ...................... | 208/216 |
| 3,960,508 | 6/1976 | Bessant et al. ...................... | 108/146 |
| 4,005,985 | 2/1977 | Hutson, Jr. .......................... | 208/146 |
| 4,197,205 | 4/1980 | Hirs .................................... | 210/290 |
| 4,234,314 | 11/1980 | Jones .................................. | 208/146 |

OTHER PUBLICATIONS

"Entrained Particle Collection in Packed Beds", Stephen Jackson and Seymour Calvert, A.I.Ch.E. Journal, vol. 12, No. 6, pp. 1075–1078 (1966).

"Filtration of Aqueous Latex Suspensions Through Beds of Glass Spheres", Joseph A. Fitzpatrick & Lloyd A. Spielman, Journal of Colloid and Interface Science, vol. 43, No. 2, May 1973.

*Primary Examiner*—Andrew H. Metz
*Assistant Examiner*—Glenn A. Caldarola
*Attorney, Agent, or Firm*—S. R. LaPaglia; W. K. Turner; V. J. Cavalieri

[57] ABSTRACT

A packed bed reactor for hydrocarbon processing and method of use is provided. The reactor comprises:

(a) a first packed bed of particles in fluid communication with a feed inlet to said reactor, said first packed bed extending more than 3 to 18 inches in the direction of flow and comprising predominantly particles at least about $\frac{3}{8}$ inch in diameter;

(b) a second packed bed of particles in fluid communication with said first packed bed and downstream of said first packed bed, said second packed bed extending at least 12 to 48 inches in the direction of flow and comprising predominantly particles having diameters within the range of 3/16 to 5/16 inch and smaller than the average diameter of particles in said first bed; and (c) a third packed bed of particles in fluid communication with said second packed bed and downstream of said second packed bed, said third packed bed comprising predominantly particles having diameters below $\frac{1}{8}$ inch.

14 Claims, 2 Drawing Figures

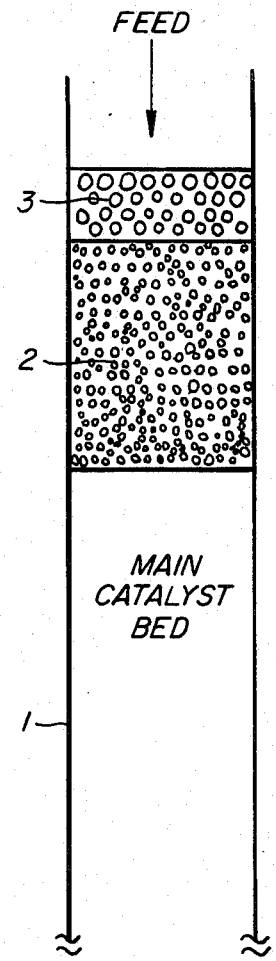
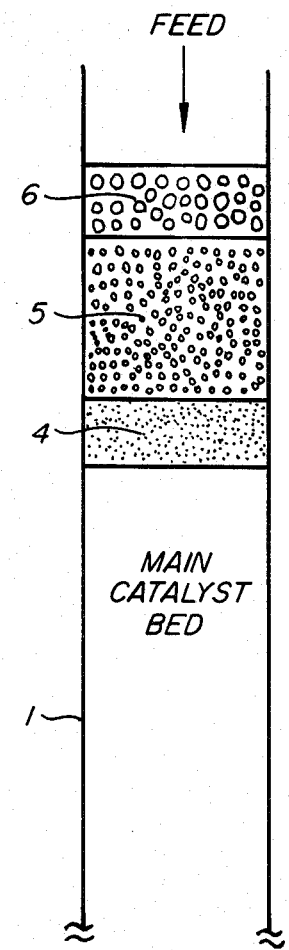
FIG._1.    FIG._2.

METHOD FOR CONTACTING SOLIDS-CONTAINING FEEDS IN A LAYERED BED REACTOR

CROSS-REFERENCE TO RELATED APPLICATIONS

This application is a continuation-in-part of application Ser. No. 547,162, filed Oct. 31, 1983, which in turn is a continuation of application Ser. No. 316,387, filed Oct. 26, 1981 both abandoned.

BACKGROUND OF THE INVENTION

This invention relates to the chemical processing of hydrocarbonaceous fluid feeds containing suspended solids and more particularly to processing hydrocarbonaceous feedstocks under hydrocarbon conversion conditions in packed bed reactors. Packed bed reactors are employed in a number of industries for converting fluid feedstocks. The packing can be reactive material, catalytic material, or inert material and can also act as deposition sites for reactants or products.

Plugging problems can occur when packed bed reactors are used to process fluids which contain suspended solids. Plugging is manifested by an unacceptable pressure drop across the reactor causing premature shutdown, for example, the shutdown of catalytic reactors while usable catalytic activity remains. Granular filter media are used in many industries for the removal of contaminants from liquids.

However, temperatures and pressures, flow velocities, viscosities, fluid properties, and catalyst and suspended solid composition and size distributions are so unique to petroleum refinery processing that unique solutions are sought. For example, while some industries are interested in providing liquids of great clarity, thereby requiring filter techniques for the removal of suspended solids even smaller than 10 microns in diameter, such techniques and filter designs have no application in petroleum refinery packed bed reactor technology where suspended solids of 10 microns in diameter or less cannot plug a reactor containing, for example, catalyst particles of ⅛ inch in diameter.

However, plugging can be particularly troublesome in downflow packed bed reactors. In the hydrocarbon processing industry, plugging is often encountered in downflow reactors that employ catalysts about ⅛ inch in diameter or less, e.g., 1/32 to 3/32 inch in diameter.

One technique used in the hydrocarbon processing industry is to employ one or more guard beds above active catalyst particles in order to protect the catalyst from incoming solids in the feed. Such guard beds have had only limited success, however. Even when multiple guard beds are used, catalytic reactors often experience unacceptable plugging, causing premature shutdown. Particularly troublesome is the uneven capture of solids in the guard bed leading to high local concentrations of solids.

One guard bed configuration is described in U.S. Pat. No. 3,562,800 wherein layers of ½ inch and ¼ inch aluminum balls are used above a 1/32 inch catalyst bed. The depths of the beds are unspecified, however. Table 1 depicts several guard bed sequences which have been used for downflow packed catalyst beds in the hydrocarbon processing industry.

TABLE 1

| Configuration | Depth (inches) | Particle Diameters (inches) | Type |
|---|---|---|---|
| A | 6–12 | ½–¾ | spheres |
| B | 6 | 1½ | saddles |
|   | 6 | ½–¾ | spheres |
| C | 12 | ¼ | rings |
|   | 24 | 3/16 | tablets |
|   | 24 | 1/5 | trilobes |
| D | 12 | ¼ | spheres |
|   | 12 | 1/6 | spheres |
| E | 4 | ½ | saddles |
|   | 3 | ⅜ | spheres |
|   | 3 | ¼ | spheres |
|   | 3 | ⅛ | spheres |
|   | 4 | ½ | saddles |

SUMMARY OF THE INVENTION

According to this invention, a systematic method is provided for the design of guard beds for processing hydrocarbonaceous feedstocks. The method results in novel packed bed reactor designs and novel processes for contacting solids-containing feedstocks, in particular, feedstocks contaminated with iron sulfide solids.

In its apparatus aspects, this invention comprises a packed bed reactor for treating a hydrocarbon feedstock containing suspended solids which comprises:

(a) a first packed bed of hydrothermally stable particles in fluid communication with a feed inlet to said reactor, said first packed bed extending more than 3 to 18 inches in the direction of flow and comprising predominantly particles at least about ⅜ inch in diameter;

(b) a second packed bed of hydrothermally stable particles in fluid communication with the first packed bed and downstream of the first packed bed, said second packed bed extending at least 12 to 48 inches in the direction of flow and comprising predominantly particles having diameters within the range of 3/16 to 5/16 inch and smaller than the average diameter of particles in the first bed; and (c) a third packed bed of hydrothermally stable particles in fluid communication with the second packed bed and downstream of the second packed bed, said third packed bed comprising predominantly particles having diameters below ⅛ inch.

In some applications, an additional bed can be placed downstream of the second packed bed and in fluid communication therewith. This additional packed bed will comprise hydrothermally stable particles having diameters within the range of 1/16 and 3/16 inch and smaller than the average diameter of particles in the second packed bed. The third packed bed will be followed by a fourth packed bed in fluid communication with the third packed bed and downstream of the third packed bed and comprising predominantly particles having diameters below ⅛ inch and smaller than the average diameter of the particles in the third packed bed.

In its process aspects, this invention comprises a process for contacting a fluid hydrocarbon feedstock containing suspended solids which comprises passing the feed through the above-described packed bed reactors under petroleum processing conditions.

BRIEF DESCRIPTION OF THE DRAWINGS

FIGS. 1 and 2 are schematic depictions of a reactor with the guard bed configuration of the invention.

DETAILED DESCRIPTION OF THE INVENTION

Staged filtration of suspended solids is a broad technology wherein specific designs are needed for specific conditions. Impaction theory tends to predict beds which are too shallow to filter solids from a hydrocarbon stream, in particular iron sulfide solids. The present invention provides a deep-bed, guard bed design strategy for high temperature, high pressure hydrocarbon feedstock processing directed toward the removal of suspended solids of greater than 10 microns in diameter from mixed phase gas-liquid-solid, and preferably, wherein said solids are iron sulfide, or have a density similar to that of iron sulfide. Furthermore, in preferred embodiments of this invention, the packed bed which is protected from plugging by the guard bed design of this invention contains particles of less than about $\frac{1}{8}$ inch in diameter. For particles of less than $\frac{1}{8}$ inch in diameter, I find that suspended solids of greater than about 10 microns in diameter form a critical size range which should be removed.

According to this invention, it has been found that a packed bed of particles less than $\frac{1}{8}$ inch in diameter can be protected from plugging by disposing guard beds upstream of the packed bed of particles. The guard beds have a graded particle size which decreases in the direction of flow. The maximum particle size in the guard beds is typically $\frac{5}{8}$ to $1\frac{1}{2}$ inches, however, larger particles can be used if desired. The minimum particle size is slightly above the average particle size of the principal contact particles or catalyst in the packed bed being protected.

By "particles" herein referred to is meant the particulate material used as a reactive, catalytic or inert material in guard beds, reactors and filters. Such material, as used in embodiments of the present invention, is preferably mainly composed of porous inorganic oxides such as alumina, titania, clay, and comprises both synthetic and naturally occurring minerals. Such materials must be suitable for petroleum refining processing conditions, i.e., temperatures up to about 1500° F. and pressures up to about 3500 psig. Since petroleum processing conditions of interest are characterized by elevated temperatures and a generally reducing atmosphere, often comprising the presence of hydrogen gas, I refer to materials suitable for the particles of the present invention as "hydrothermally stable". Such petroleum refining processes include both thermal processes and catalytic processes, e.g., visbreaking, hydrocracking, reforming hydrotreating, sulfur sorbing, hydrofining, etc., any petroleum refining process where a packed bed of particles $\frac{1}{8}$ inch in diameter or less could have increased pressure drop due to the presence of solids, such as iron sulfide, in the feedstream. While "petroleum refining" and "petroleum refining conditions" are referred to herein, it is to be understood that the present invention is applicable to any hydrocarbon feedstock including those derived from shale, coal and tar sands. Furthermore, the solids suspended in the feedstock may be other than iron sulfide and may in the latter instances comprise shale solids, tar sands solids or coal tar particulate and ash. A preferred particulate material for the guard beds would be a spent catalyst particulate from the same refinery. (Of course, the solid suspended in the hydrocarbon feedstock is also a particulate material but I will avoid the use of the word "particle" in reference thereto to prevent confusion.)

Particles will be described herein in terms of their average diameters. While spherical particles are very much preferred for use in the guard bed, the guard bed particles can be in other configurations. For non-spherical particles, the diameter is defined as the smallest diameter, i.e., the smallest surface-to-surface dimension through the center or axis of the particle, regardless of the shape of the particle.

This invention is primarily applicable in downflow packed bed systems. The packed bed can be any gravity-packed bed configuration, for example, a fixed bed, a moving bed, or a bed which permits incremental addition of fresh particles.

The word "fluid", as used herein, encompasses both liquid and gaseous phases. The feeds can be liquid-solids, gas-solids, or gas-liquid-solids, and will generally contain no more than about 0.1 weight percent suspended solids. The most preferred application for this invention is the processing of fluids containing less than 10 ppmw of solids, which is typical of petroleum refinery streams. The optimum guard bed design will depend upon the size distribution of solids in the feedstream. Typical solid size distributions of interest have an average diameter between about 5 to 1,000 microns. Solids smaller than about 10 microns generally do not cause plugging problems in downflow packed beds. Solids above 1,000 microns in diameter generally are easily filtered by conventional means, prior to treatment in packed bed reactors. Solid size distributions suitable for this invention are found in a variety of feeds in the hydrocarbon processing industry. For example, naphthas, vacuum and atmospheric residua, vacuum gas oils, diesel and medium distillate streams, and a variety of other feedstocks, including certain solids-lean synthetic oils derived from coal, oil shale and tar sands, etc. The suspended solid in petroleum-derived streams is primarily iron sulfide from scaling of upstream equipment and piping, however, other solids may be present as well.

This invention employs in part the theory of impaction in packed beds which is described in Jackson et al., "Entrained Particle Collection in Packed Beds", AICHE Journal, November 1966, pages 1075–1078, which is incorporated herein by reference. According to this invention, however, it is found that impaction alone is not adequate to describe the behavior of solids in packed beds. While impaction theory might predict substantially all solids of a certain size should be trapped within the first few inches of a particle bed, it has been discovered that in practical applications solids which have impacted become re-entrained and travel further into the bed to impact other solids. Consequently, the guard beds for trapping the solids need to be significantly deeper than would be expected from impaction theory.

In embodiments of the present invention, the hydrocarbon fluid is subjected to petroleum refining processing conditions. In particular, in embodiments of the present invention, the fluid will preferably move relative to the guard bed particles with a superficial velocity of from about 0.2 to about 0.8 inch per second for up to 90% of the time in the case of a liquid, and of up to about 8 inches per second for up to 90% of the time in case of a vapor. The fluid hourly space velocity in embodiments of the present invention will preferably vary from about 1 to about 100 depending upon the fluid phase and the guard bed length.

It has been found that with typical feed solid size distribution, at least about 10 inches of 3/16 to 5/16 inch particles are needed in the guard bed. If the depth of the 3/16 to 5/16 inch diameter particle bed is insufficient, solids of the critical size, i.e., larger than 10 microns, will pass through and tend to agglomerate at the interface between that bed and the adjacent bed.

In the ideal situation, a guard bed would have a continuously decreasing particle size including a region 12 to 48 inches or deeper of particles in the 3/16 to 5/16 inch diameter range. In practice, however, such continuously decreasing size is difficult to achieve. Satisfactory results can be obtained with a plurality of discrete guard beds with each bed containing particles of predominantly the same size. Consequently, the term "bed" as used herein will include a region of particles of varying particle size within the particle size limits defined for the bed.

It is conceivable that thin intermediate beds or screens may be disposed between one or more of the guard beds. While the reactor should preferably comprise particles whose diameter decreases essentially continuously in the direction of flow, the thin intermediate beds may contain particles larger than those in one or more of the upstream beds. The thin intermediate beds should not, however, comprise particles smaller than downstream beds, as this will promote uneven solids capture, leading to premature pressure drop build-up.

The number of guard beds and the size of the bed particles will depend upon the characteristics of the feed. The following examples describe the cases of liquid-solid, gas-solid, and gas-liquid-solid feeds. The examples will illustrate the use of inert guard bed particles above catalyst beds; however, it should be understood that the guard bed particles may themselves contain active catalyst materials such as transition metals, etc. The guard bed particles may, in fact, be of the same composition as the main catalyst or contact particles, and may be spent catalyst of said composition.

The designs depicted in the following examples are embodiments of the invention suitable for processing hydrocarbonaceous feedstocks at typical refinery processing conditions, for example, elevated pressures of up to about 3500 psig and elevated temperatures of up to about 1500° F., preferably pressures of 500 to 3000 psig and temperatures of 300° F. to 1200° F., more preferably pressures of 1000 to 2000 psig and temperatures of 600° F. to 900° F. These embodiments are also preferred for the treatment of hydrocarbonaceous feedstocks, and particularly, hydrocarbonaceous feedstock contaminated with iron sulfide solids. Of course, the temperature and pressure in a given guard bed will vary within and between these ranges with time during the same run.

EXAMPLE 1

Liquid-Solid Feed

Referring to FIG. 1, the hydrocarbon feedstock enters the reactor 1 through an inlet and encounters a first packed bed 3 containing particles above ⅜ inch, preferably ⅜ to 1 inch, and most preferably about ½ inch in diameter. The first packed bed is more than about 3 inches deep and can extend up to about 18 inches or more in depth, e.g., 24, 36 inches, etc. The preferred depth of the first packed bed is 6 inches. The function of the first bed is to trap large solids and to stabilize the lower beds and protect them from inlet surges, etc. The second packed bed 2 contains predominantly particles in the range of 3/16 to 5/16 inch in diameter, preferably about ¼ inch in diameter. The second packed bed is at least about 12 to 48 inches deep and can be more than 48 inches deep, preferably about 2 feet deep. The main catalyst bed contains cylindrical extrudate catalyst 1/32 to 3/32 inch in diameter, preferably about 1/16 inch in diameter and with a length-to-diameter ratio of from 2 to 10. The main catalyst bed can be any depth. Preferably the first and second beds contain spherical particles. This design is especially well suited for capturing solids with an average diameter of about 5 to 1,000 micrometers, preferably 25 to 250 micrometers average diameter. If most of the feed solids by weight are smaller than 50 microns in diameter, the second catalyst bed can be replaced by about 12 inches of 3/16 to 5/16 inch diameter spheres on top of about 12 inches of 1/16 to 3/16 inch diameter spheres. The additional 1/16 to 3/16 inch spheres should also be used where the main catalyst bed contains catalyst smaller than about 1/16 inch in diameter. If most of the feed solids by weight are larger than 300 microns in diameter, the first catalyst bed should be increased in depth.

EXAMPLE 2

Gas-Solid Feeds

Again referring to FIG. 1, the first particulate bed 3 in this case should contain spheres above ⅜ inch, preferably ½ to 1½ inches in diameter, and most preferably about ¾ inch in diameter. The first packed bed is more than about 3 inches deep and can extend up to 18 or more inches, e.g., 24, 36 inches, etc. The first packed bed is preferably about 9 inches deep. The second packed bed contains particles predominantly 3/16 to 5/16 inch in diameter, preferably about ¼ inch in diameter, and should extend from about 12 to 48 inches in depth, preferably about 24 inches. The main catalyst bed is again a cylindrical extrudate catalyst 1/32 to 3/32 inch in diameter, preferably 1/16 inch in diameter, and having a length-to-diameter ratio of 2 to 10. Again, this design is suited for capturing solids of 5 to 1,000 micrometers in diameter, preferably with an average particle diameter of 25 to 250 micrometers. If most solids to be captured by weight are smaller than 50 micrometers, the second packed bed can be replaced by 18 inches of 3/16 to 5/16 inch spheres followed by about 6 inches of 1/16 to 3/16 inch spheres. Also the first catalyst bed can be replaced by about 6 inches of about ½ inch diameter spheres. In gas phase reactors, a number of flakes of sulfides from upstream equipment can be much larger than the remainder of the feed particles. When this condition is encountered or when most of the feed solids by weight are solids larger than 300 micrometers in diameter, the first particulate bed should contain about 12 inches of spheres of about 1 inch in diameter.

If severe plugging problems are expected, an additional bed, about 12 inches deep, of spheres 1/16 to 3/16 inch in diameter can be employed between the second packed bed and the main catalyst bed. The additional bed of 1/16 to 3/16 inch spheres should also be used when the main catalyst bed contains catalyst smaller than about 1/16 inch in diameter.

EXAMPLE 3

Gas-Liquid-Solid Feed

Referring to FIG. 2, the hydrocarbon feed to the reactor 1 encounters the first packed bed 6 which contains particles above ⅜ inch in diameter, preferably ⅜ to 1 inch, and most preferably about ½ inch. The depth of the first packed bed is more than about 3 inches, and can be up to 18, 24, 36 or more inches, preferably about 6 inches. The second packed bed 5 contains spheres predominantly 3/16 to 5/16 inch in diameter and is 12 to 48 or more inches in depth, preferably about 18 inches in depth. The third packed bed 4 contains particles of 1/16 to 3/16 inch in diameter, preferably about ⅛ inch in diameter. The third packed bed is at least about 3 to 18 or more inches in depth, preferably about 6 inches in depth. The main catalyst bed is preferably cylindrical extrudate catalyst 1/32 to 3/32 inch in diameter, preferably about 1/16 inch in diameter, and having a length-to-diameter ratio of about 2 to 10. Again, this example is well suited for capturing solids with an average size in the range of 5 to 1,000 micrometers, preferably 25 to 250 micrometers in diameter. If most of the solids to be captured by weight are smaller than about 50 micrometers in diameter, the third packed bed 4 should be increased in depth to about 12 inches and the second packed bed 5 can be reduced in diameter to about 12 inches. If most of the solids to be captured by weight are larger than about 300 micrometers, the first catalyst bed should be about 12 inches in depth. Where the main catalyst bed contains particles smaller than about 1/16 inch in diameter, the third packed bed should be at least about 12 inches deep.

The configurations described in Examples 1 through 3 are primarily suited for reactors which in the absence of the guard bed form undesirable plugs when less than 20% of their normal catalyst life would be utilized. If the reactors would operate substantially more than about 20% of their normal catalyst run life without the guard beds, then the guard bed design could be modified to reduce the depth of particles in the second packed bed, i.e., the 3/16 to 5/16 inch particles.

The following experimental results illustrate the drastically improved performance of a downflow cold model pilot plant reactor 4 inches in diameter containing 1/16 diameter extrudate catalyst. The feed was hexane containing ½ to 1% solids which had been collected from a fouled reactor and which comprised essentially iron sulfide. These iron sulfide solids are representative of the particulate contaminant encountered in commercial practice. Hexane was chosen to approximate the density and viscosity of liquid naptha at normal process temperature and pressure. The concentration of the feed solids was deliberately much higher than ordinarily encountered in practice in order to reduce the time of the experiment. The results are depicted in Table 2. The reactor loading is in the downward direction.

TABLE 2

| Reactor Loading | Collected Solids (lbs./sq. ft.) | Pressure Drop (psi) | Length of Run (min.) |
| --- | --- | --- | --- |
| 12 inches of 1/16 inch diameter cylindrical extrudate | 3.4* | 10 | 6 |
| 12 inches of ½ inch spheres + 12 inches of 1/16 inch diameter cylindrical extrudate | 2.1* | 10 | 4 |
| 12 inches of ¼ inch spheres + 12 inches of 1/16 inch diameter cylindrical extrudate | 7.6 | 0.3 | 16 |
| 24 inches of ¼ inch spheres + 12 inches of 1/16 inch diameter | 13.9 | 0.4 | 21 |

TABLE 2-continued

| Reactor Loading | Collected Solids (lbs./sq. ft.) | Pressure Drop (psi) | Length of Run (min.) |
| --- | --- | --- | --- |
| cylindrical extrudate | | | |
| 6 inches of ½ inch spheres + 12 inches of ¼ inch spheres + 6 inches of ⅛ inch spheres + 12 inches of 1/16 inch diameter cylindrical extrudate | 22.8 | 1.5 | 43 |

*Most solids collected in first 2-3 inches of 1/16 inch catalyst bed.

It is seen that when no guard bed is used, a very low solids loading was obtained, and the 10 psi pressure drop occurred after only 6 minutes of operation. With a guard bed containing only 12 inches of ½ inch spheres, the solids loading was also low and the 10 psi pressure drop occurred after only 4 minutes. With guard beds containing 12 or 24 inches of ¼ inch spheres, the solids collection was significantly increased with only a very low pressure drop after much longer run times. The triple guard bed was allowed to operate to a higher solids loading and pressure drop.

Those skilled in the art will recognize that the guard bed design depicted herein can be modified to account for differences in feed solids, etc. without departing from the spirit and scope of this invention. Such modifications are contemplated as equivalent of the embodiments particularly described herein.

What is claimed is:

1. A process for contacting a fluid hydrocarbon feed containing suspended solids comprising passing said feed through a packed bed reactor containing catalyst particles of about ⅛ inch diameter or less comprising:
    (a) a first packed bed of hydrothermally stable particles in fluid communication with a feed inlet to said reactor, said first packed bed extending more than 3 to 18 inches in the direction of flow and comprising predominantly particles at least about ⅜ inch in diameter;
    (b) a second packed bed of hydrothermally stable particles in fluid communication with said first packed bed and downstream of said first packed bed, said second packed bed extending at least 12 to 18 inches in the direction of flow and comprising predominantly particles having diameters within the range of 3/16 to 5/16 inch and smaller than the average diameter of particles in said first bed; and
    (c) a third packed bed of hydrothermally stable particles in fluid communication with said second packed bed in downstream of said second packed bed, said third packed bed comprising predominantly particles having diameters below ⅛ inch wherein the packed bed reactor is maintained at elevated pressures of up to about 3,500 psig and elevated temperatures of up to 1500° F.

2. A process according to claim 1 wherein at least one of said first and second packed beds comprises substantially spherical particles.

3. A process according to claim 1 wherein said suspended solids comprise iron sulfide.

4. A process according to claim 1 wherein said feed contains liquid and solids and is passed downwardly through said reactor, said first packed bed comprises predominantly particles within the range of ⅜ to ⅝ inch in diameter, and said third packed bed comprises predominantly particles 1/32 to 3/32 inch in diameter.

5. A process according to claim 1 wherein said feed comprises gas and solids and is passed downwardly through said reactor, said first packed bed comprises substantially particles within the range of ⅜ to 1 inch in diameter, and said third packed bed comprises particles predominantly within the range of 1/32 to 3/32 inch in diameter.

6. A process according to claim 12 wherein said first packed bed comprises predominantly particles about ¾ inch in diameter and second packed bed comprises predominantly particles about ¼ inch in diameter.

7. A process of contacting a hydrocarbon fluid feed containing suspended solids comprising passing said feed in a downflow direction through a packed bed reactor comprising:

(a) a first packed bed of hydrothermally stable particles in fluid communication with a feed inlet to said reactor, said first packed bed extending more than 3 to 18 inches in the direction of flow and comprising predominantly particles within the range of ⅜ to 1½ inches in diameter;

(b) a second packed bed of hydrothermally stable particles in fluid communication with said first packed bed and downstream of said first packed bed, said second packed bed extending at least 12 to 48 inches in the direction of flow and comprising predominantly particles having diameters within the range of 3/16 to 5/16 inch and smaller than the average diameter of particles in said first bed;

(c) a third packed bed of hydrothermally stable particles in fluid communication with said second packed bed and downstream of said packed bed, said third bed extending 3 to 48 inches in the direction of flow, said third packed bed comprising predominantly particles having diameters within the range of 1/16 to 3/16 inch and smaller than the average diameter of particles in said second bed; and (d) a fourth packed bed of hydrothermally stable particles in fluid communication with said third packed bed and downstream of said third packed bed, said fourth packed bed comprising predominantly particles having diameters below ⅛ inch and smaller than the average diameter of particles in said third packed bed and wherein the packed bed reactor is maintained at elevated pressures of up to about 3,500 psig and elevated temperatures of up to 1500° F.

8. A process according to claim 7 wherein at least one of said first and second packed beds comprises substantially spherical particles.

9. A process according to claim 7 wherein said feed comprises liquids, gas and solids and is passed downwardly through said reactor, said first packed bed comprises predominantly particles within the range of ⅜ to ⅝ inch in diameter, said third packed bed comprises predominantly particles within the range of 1/16 to 3/16 inch in diameter, and said fourth packed bed comprises particles predominantly within the range of 1/32 to 3/32 inch in diameter.

10. A process according to claim 9 wherein said first packed bed comprises predominantly particles about ½ inch in diameter, said second packed bed comprises predominantly particles about ¼ inch in diameter, and said third packed bed comprises predominantly particles about ⅛ inch in diameter.

11. A process according to claim 4 wherein said fluid feed contains less than 0.1% by weight solids and said solids in said feed have an average diameter in the range of 25 to 250 micrometers.

12. A process according to claim 7 wherein said fluid feed contains less than 0.1% by weight solids and said solids and said feed have an average particle diameter within the range of 25 to 250 micrometers.

13. A process according to claim 11 wherein said feed contains less than 10 ppm by weight solids.

14. A process according to claim 12 wherein said feed contains less than 10 ppm by weight solids.

* * * * *